Sept. 3, 1968  W. S. MORGAN ET AL  3,400,018
HANDLING LAMINATING PLATES
Filed March 27, 1964  5 Sheets-Sheet 3
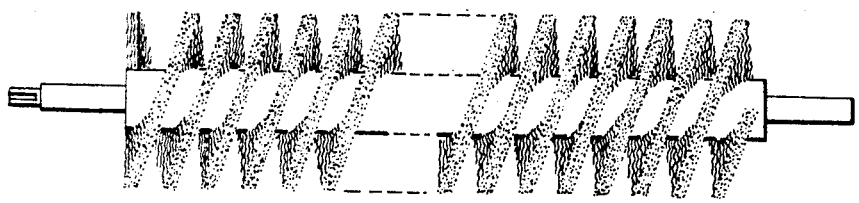
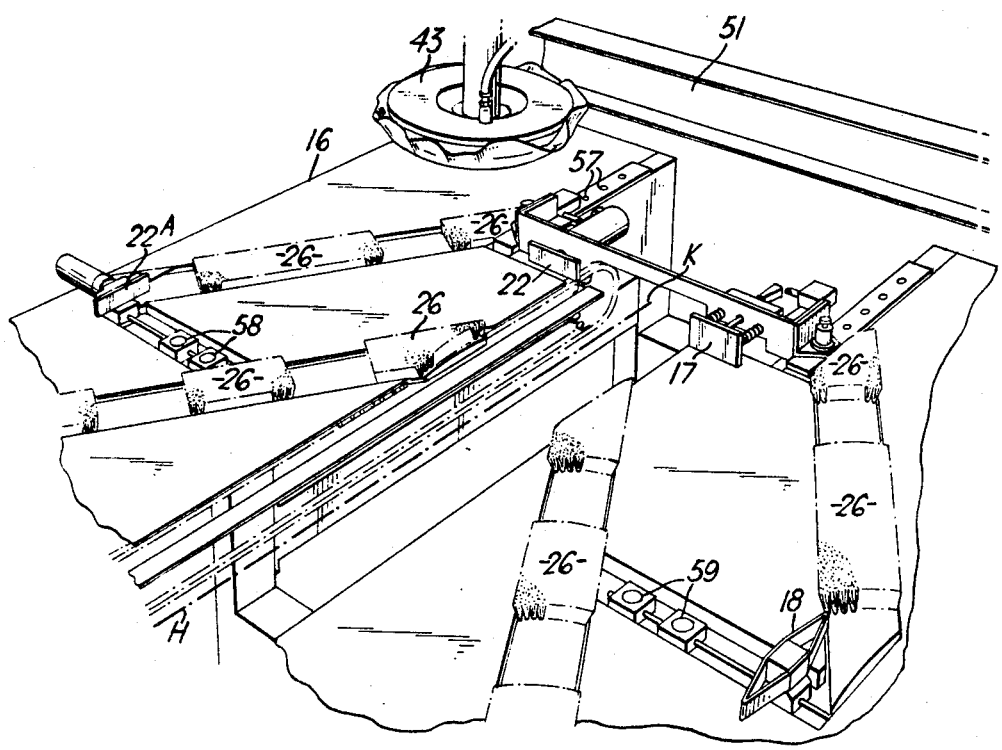
Inventors
William S. Morgan
Geoffrey Bland
By
Stevens, Davis, Miller & Mosher
Attorneys

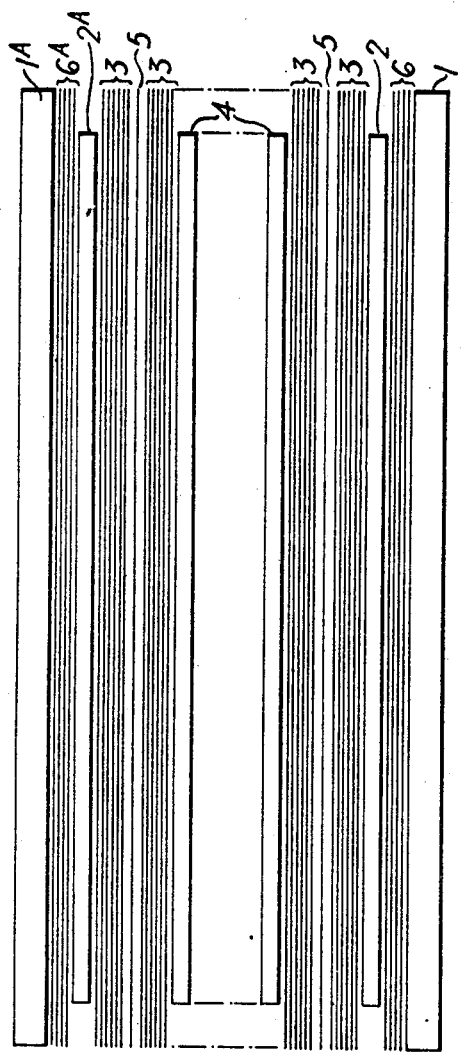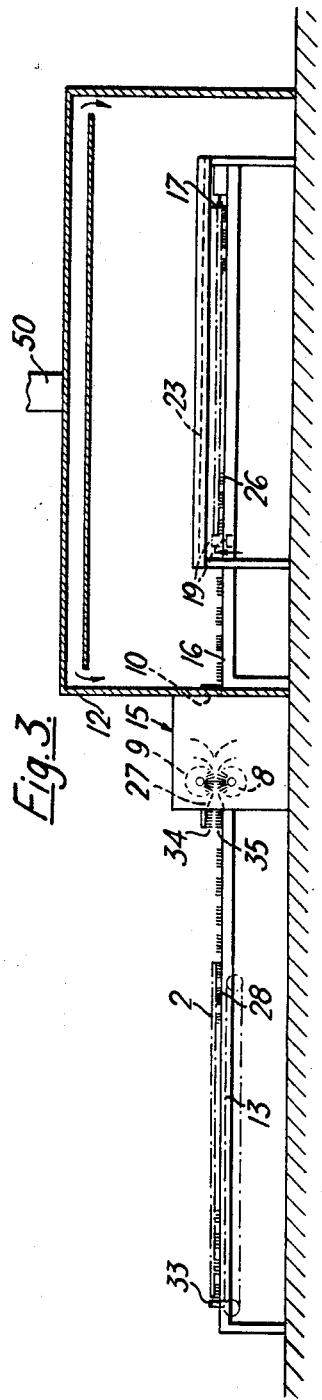

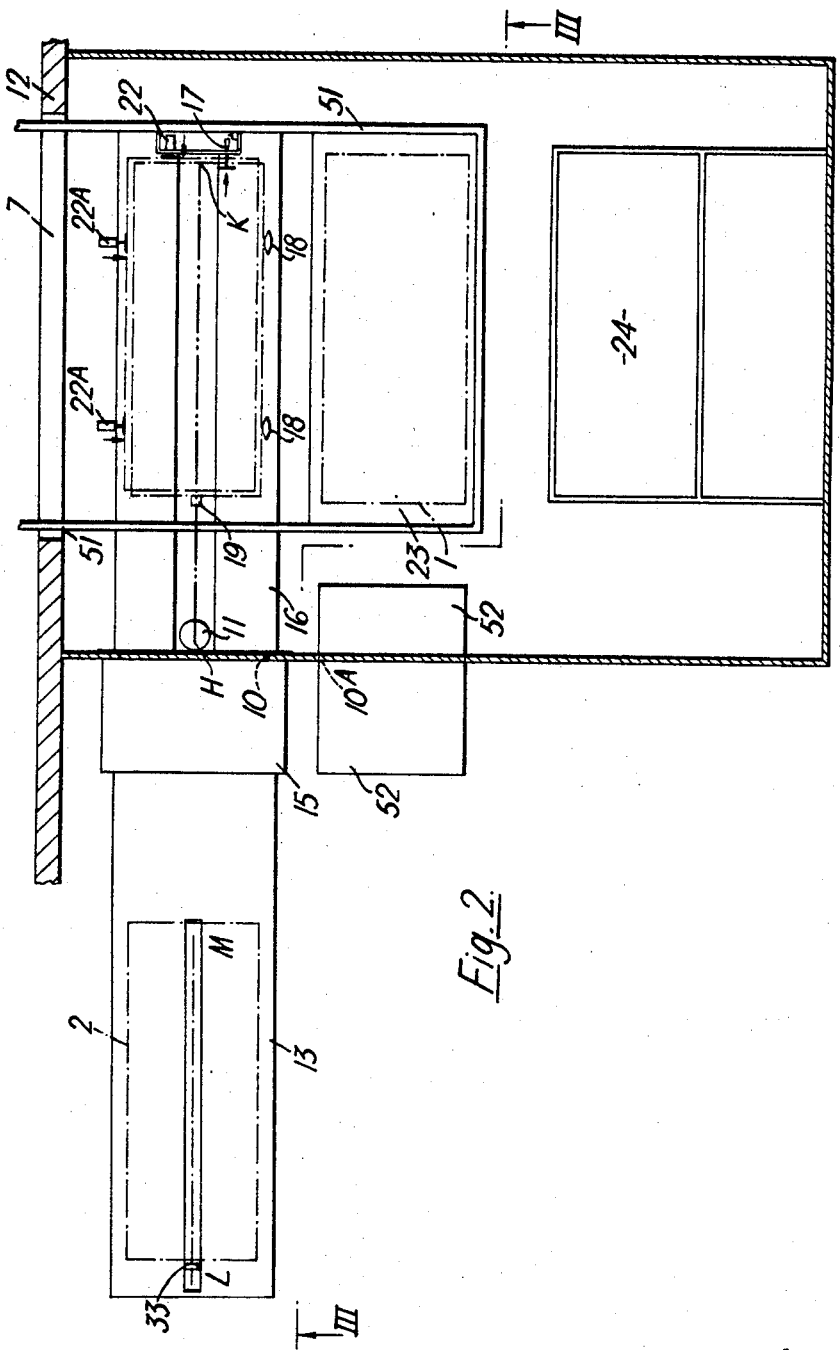

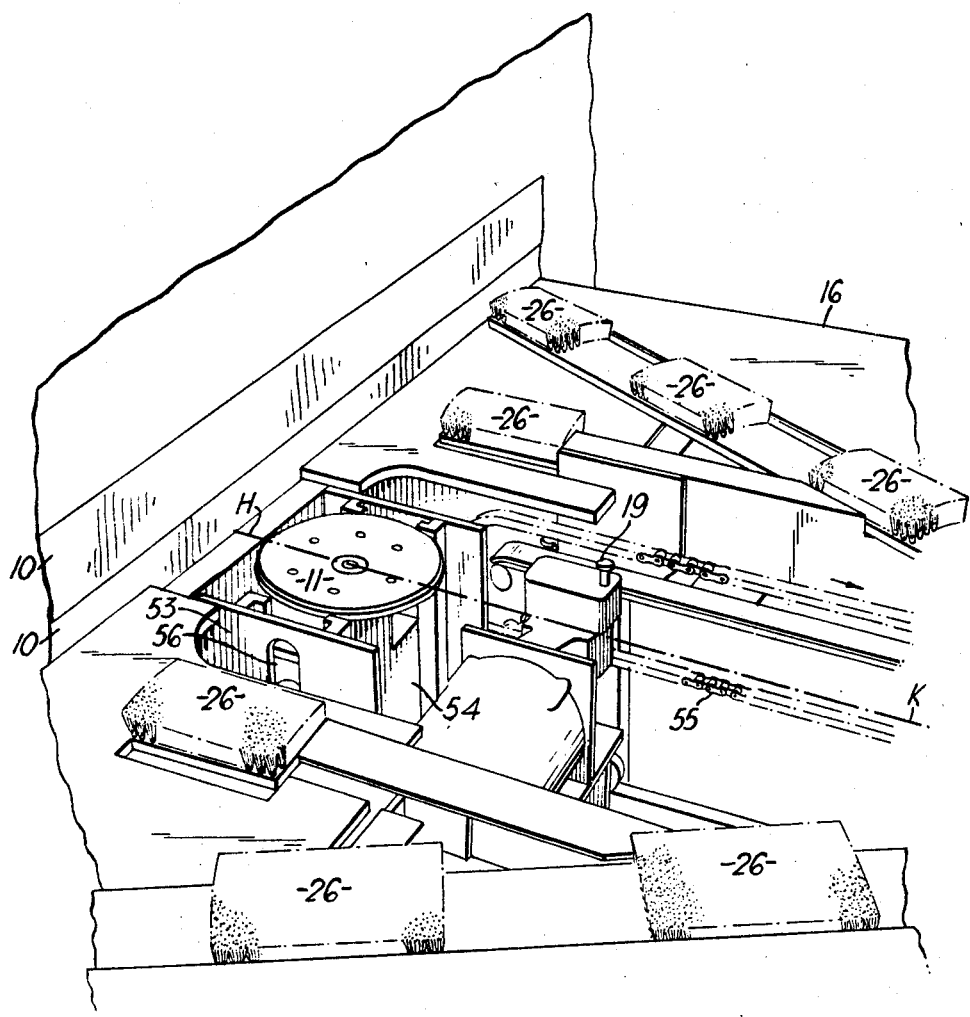

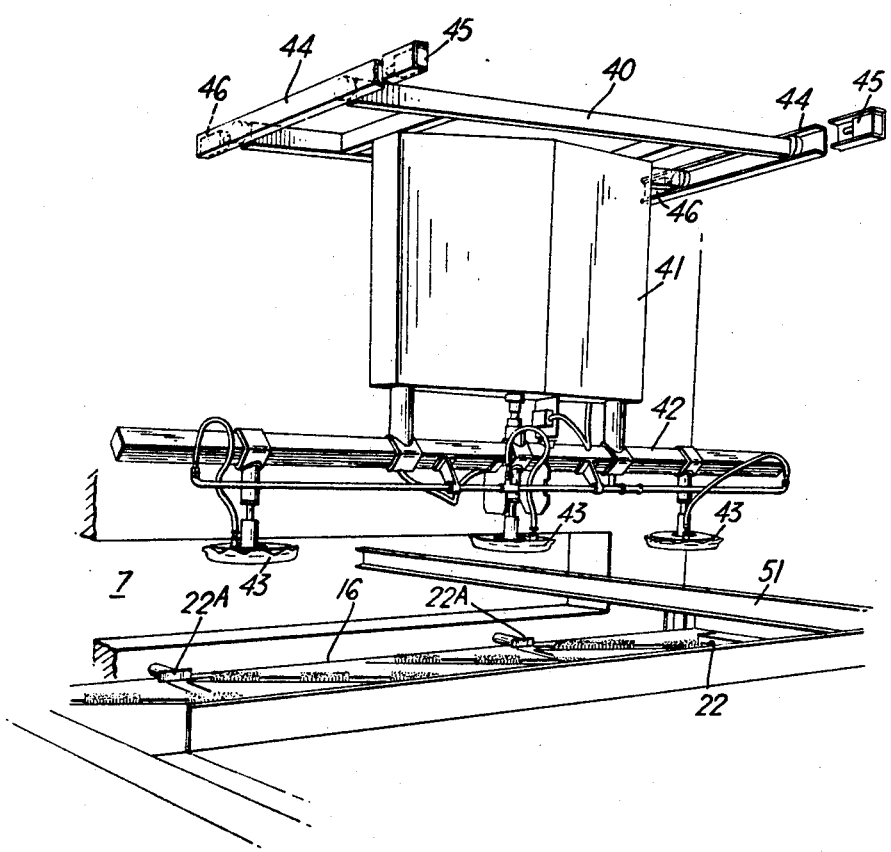

United States Patent Office 3,400,018
Patented Sept. 3, 1968

3,400,018
HANDLING LAMINATING PLATES
William S. Morgan and Geoffrey Bland, Newcastle-upon-Tyne, England, assignors to Formica International Limited, London, England, a British company
Filed Mar. 27, 1964, Ser. No. 355,358
Claims priority, application Great Britain, Mar. 29, 1963, 12,476/63
6 Claims. (Cl. 134—42)

ABSTRACT OF THE DISCLOSURE

A method of preparing press plates and interposed sheet materials comprising the steps of supporting the plates horizontally so that their surfaces are not damaged, feeding them sequentially through a plate-cleaning, dust-removing unit, and a slit-like opening to a first position within an assembly chamber, sliding each plate to an exact second position, lifting each plate from the second position and conveying it through a predetermined distance in its plane or in a plane parallel thereto to a position over laying-up table and depositing the plate upon the table at a predetermined stage of a stack assembly process.

---

This invention relates to methods of and apparatus for handling and cleaning press plates primarily for use in the production of laminated plastic boards. The invention whilst being particularly useful in the manufacture of thermosetting resin-impregnated paper base laminates of the decorative kind it may be applied equally to the manufacture of other articles requiring the use of accurately positioned metal plates under clean and dust-free conditions.

The mass production of high pressure decorative laminated plastic boards involves the use of multi-daylight presses between the heated platens of which are pressed a convenient number of suitably arranged assemblies of thermosetting resin impregnated sheets of paper and polished press plates, the latter being in contact with the outer most of the decorative sheets in each stack. Typically an assembly comprises a number of core sheets impregnated with a phenol formaldehyde resin, a decorative sheet impregnated with a melamine formaldehyde resin on one side of the core sheets and on top of the decorative sheet an overlay in the form of a sheet of alpha cellulose paper impregnated with a melamine formaldehyde resin. The resin impregnated sheets are all in a handleable condition as the result of controlled heat-treatment after impregnation. During the press cycle the resins are cured to substantially their infusible and insoluble state. The overlay sheet which is translucent when assembled becomes transparent during the period that the assembly is in the press with the result that the decoration on the print sheet is visible in the finished laminated board. The press plates impart to the overlay their own highly polished finish.

One form of assembly involves the pressing of single sided decorative laminated plastic boards with their backs adjacent; in such a case a sheet adapted to facilitate separation of the two boards after pressing is inserted between the outer most sheets of the two assemblies and double sided polished press plates are arranged between each adjacent pair of decorative surfaces with the exception of the outer most assembly in which case it is usual for reasons of economy to use press plates which have only one polished side. Alternatively single-sided assemblies may be pressed with all the decorative surfaces facing the same way and in this case single sides polished plates are used with the interpositioning of separating sheets between the back of each assembly and the unpolished surface of the adjacent press plate. No matter what form of assembly is used great care must be taken in building up the assemblies before they are loaded into the press. This involves building up on a lay-up table a complete assembly for one daylight which includes upper and lower caul plates with the desired arrangement of impregnated sheets and press plates stacked between them; additionally it is usual to include unimpregnated paper sheets which act as a pad and serve to equalise the pressure between each caul plate and its adjacent press plate. The assemblies when prepared are transferred to a trolley and thence to a loader from which they are loaded into the press.

The building up of press assemblies requires considerable care and attention. It is essential that the plates are clean when they are put into position in the assembly and this necessitates some form of recleaning between each use of the plates. Additionally no dust or foreign bodies must be introduced on the press plates during the laying-up operation for any such material entering the press will produce decorative laminates having damaged surfaces or alternatively and additionally the press plate itself may become damaged and will, at best, require a costly reclamation treatment.

The components of an assembly do not all have the same area, the caul plate is normally the largest in area and the press plates are invariably smaller in area than the impregnated paper sheets. It is important that since maximum pressure is exerted only over that area where all the components overlap that the press plates should be accurately positioned in vertical coincidence one to the other.

Known manual methods of producing the assemblies requires great care in order to avoid accidental damage or scratching of the highly polished surfaces and considerable experience and skill on the part of the operators in order to accurately align the press plates. One object of this invention is to provide automatic means for cleaning press plates and for delivering them to a laying-up table under conditions of substantial freedom from dust.

A further object of the invention is to provide means for positioning the press plates of an assembly in exact vertical coincidence one with another.

According to this invention there is provided a method of handling press plates for use in a laminating process wherein the plates are cleaned, passed sequentially into a chamber through a restricted opening, accurately located in a predetermined horizontal position and then moved by a conveyor to a laying-up table, said conveyor being adapted to move each plate through a predetermined distance in the plane of the plate or in any plane parallel thereto.

According to another aspect of the invention we provide apparatus for handling press plates for use in a laminating process such apparatus comprising a chamber, a restricted opening in said chamber for the entry of press plates, means for sequentially feeding press plates into the chamber, means for cleaning the press plates, plate support means within said chamber, means for locating each plate in a predetermined position on the plate-support means, a laying-up table and a conveyor adapted to move each plate to the laying up table through a predetermined distance in the plane of the plate or in any plane parallel thereto.

In order that this invention may be more readily understood the following description is given of one form of apparatus the operation of which is given as an illustration of the method of the invention.

FIGURE 1 is a diagrammatic side elevation of an assembly suitable for loading into a daylight of a multi-daylight laminating press.

FIGURE 2 is a schematic plan view of the complete apparatus for handling press plates.

FIGURE 3 is a vertical section on the line III—III of FIGURE 2.

FIGURE 4 is a side elevation of a rotary brush used in the cleaning means of FIGURES 1 and 2.

FIGURE 5 is a perspective view illustrating the means for withdrawing plates from the cleaning means.

FIGURE 6 is a perspective view of the accurately positioning means, and

FIGURE 7 is a perspective view of the conveyor means for moving the plate a predetermined distance.

FIGURE 1 shows in detail assemblies for the manufacture of four laminated panels; these are arranged in two pairs one at the top and one at the bottom. Any convenient additional number of pairs of assemblies may be included between these illustrated and the space to accommodate them is indicated generally by the chain dotted lines. Each assembly comprises a set of superposed resin-impregnated paper sheets 3 of such a kind that the laminated panel produced therefrom has one decorative and one non-decorative surface. The arrangement is such that the non-decorative surfaces of each pair of assemblies are next to each other save for the interposed "glassine" release sheets 5. The decorative surfaces of the assemblies contact the polished surfaces of press plates 2, 2A or 4 in the manner described below.

The complete assembly for inserting into the daylight of a multi-daylight press is made up on a caul plate 1 which comprises a steel plate of approximately 1/8" in thickness. On to this is placed a plurality of resin-free sheets of paper 6 which form a resilient pad between the caul plate 1 and the dull surface of a single-sided polished press plate 2. On to the plate 2 is placed the first of the assemblies 3 with the decorative surface sheet in contact with the surface of the plate. A "glassine" release sheet is then placed onto the outermost non-decorative sheet of the first assembly and this is followed by the second assembly 3 the component sheets of which are in reverse order to those of the first. A double sided polished press plate 4 is placed on top of the second assembly, that is to say in contact with the decorative surface sheets thereof. Further pairs of assemblies are then added as desired and a second single-sided polished plate 2A is then placed on top of the pile with its polished surface in contact with the decorative surface sheet of the uppermost assembly. Pad sheets 6A and upper caul plate 1A complete the buildup.

The general arrangement of the pressurized dust free room and plate handling apparatus will now be described with reference to FIGURES 2 and 3. Symbol 12 denotes a substantially sealed room, which includes access openings (not shown) for personnel, a slit opening 10 which includes a pair of contacting rubber flaps extending for the length of the slit, an external cleaning unit 15 surrounding the opening 10, an exit aperture 7 for the finished products from the room and a tubular opening 50 which is connected to a source of filtered air capable of maintaining the room at super atmospheric air pressure. A second slit opening 10A which also includes a pair of contacting rubber flaps is provided in the same wall of the room as slit opening 10 for the entry of caul plates into the room; a horizontal table 52 is provided below this slit to facilitate handling of the caul plates.

The plate feeding and cleaning apparatus which is situated outside the room includes a horizontal framework 13 which is adapted to receive press plates which are to be fed into the room. The framework 13 includes a plurality of brushes 28 arranged with their bristles upstanding and which provide a non-scratch supporting means for the plates placed thereon; one such plate is indicated at 2.

A horizontal pusher 33 provided at the end of the framework 3 remote from the room is capable of reciprocating between the limits L–M and propelling the plate into the cleaning unit 15.

The cleaning unit comprises a casing 15 mounted adjacent to the slit opening 10 formed in the wall of the room 12. The casing includes a pair of transversely disposed brushes 34 and 35 mounted in a slit opening in the casing in line with the top of the supporting brushes 28. A pair of rotating cylindrical brushes 8 and 9 are situated transversely within the casing and capable of cleaning simultaneously both sides of a plate passing therebetween. These revolving brushes have a helical bristle formation which is shown in greater detail in FIGURE 4. The interior of the casing is substantially sealed by means of the brushes 34, 35 and the rubber flaps of the slit opening 10. A vacuum source 27 provided in the vicinity of the brushes removes dust from the casing.

A second horizontal framework 16 in alignment with the framework 13 is provided within the room 12. Spaced upstanding brushes 26 constitute the plate support surface of the framework 16 which additionally includes a vacuum cup conveyor 11 capable of reciprocating between the limits H–K within a channel formed in the framework 16 and engaging the underside of a plate and propelling it against a spring loaded buffer 17. A compressed air actuated pusher 22 in conjunction with a vertically retractable stop 19 and a pair of actuated compressed air-pushers 22A in conjunction with fixed stops 18 are provided to position the plate in an exact predetermined position.

A laying-up table 23 is provided adjacent to and at a slightly higher level than the framework 16. This table is provided at its ends with rollers which are capable of running within a pair of parallel channel-section guide rails 51 which pass above the framework 16 and associated components and thence out of the room 2 through the opening 7.

The room 12 also includes a table 24 for receiving the resin impregnated paper sheets required for making up the assemblies.

The apparatus for conveying and accurately positioning the plates within the room will now be described with reference to FIGURE 5 which shows the end of the framework 16 where the plates enter the room, and FIGURE 6 which shows the opposite end where they are positioned.

Framework 16 is provided with a central thoroughfare into which a carriage 53 is free to reciprocate in a horizontal direction. This carriage includes a second vertically slidable component 54 which is connected to a pair of endless chains (one of which is shown at 55) and which is free to rise and fall within elongated slots 56 formed in the carriage 53. The suction cup 11 is mounted on the component 54 and thus when the chains are driven in a unidirectional manner as indicated by the arrow the cup will rise vertically to engage with the underside of the plate and will then travel horizontally to the opposite end of the framework; after this suction is cut off and the cup descends and returns to its starting position in a horizontal direction parallel to and below the first path of travel.

The chains for operating the suction cup 11 and the mechanism for reciprocating the pusher 33 are both driven by the same prime mover (not shown) with the result that there is no difference in the plate velocity between the two conveying means. Spring-loaded buffer 17 serves to arrest the plate and pusher 22 engages the end of it and propels it in the opposite direction through a small linear distance to position the plate accurately in its longitudinal dimension against the stop member 19. Means not shown, are provided to withdraw stop member 19 below the level of a plate whilst it is being transported and to elevate the member once more after the plate has been released and the carriage 53 has returned to its initial position; in its raised position the member 19 is thus capable of engaging the rear end of the plate. The transverse pushers 22A on the framework 16 are adapted to propel the plate sideways through a small transverse distance and to position it against the fixed stop members 18. Means for incrementally adjusting the various components is provided so that the apparatus may be quickly adapted to handle plates of a different size. The adjustment means are as follows:

(1) For mounting the supporting means for the buffer 17 and the longitudinal pusher 22, a plurality of holes 57.

(2) For the transverse pushers 22A, two alternative location holes 58.

(3) For the transverse stop members 18, two alternative location holes 59.

The plate lifting and transporting means which will now be described by reference to FIGURE 7 comprises a mechanical raising and lowering device contained within a casing 41 and carried on a gantry 40 which is free to run along a pair of overhead rails 44 situated above the horizontal framework 16 and the laying-up table 23. The gantry is power actuated and cycled so as to stop at exact positions at the extremes of its movement by means of preset limit switches 45 and 46. The elevating part of the gantry which is also automatically controlled by means of limit switches comprises a horizontal lifting beam 42 on to which is mounted three vacuum cup assemblies 43. Each vacuum cup is fitted with a cloth covered working face to avoid marking the surface of the press plates.

Below the gantry a concertina type shutter (not shown) is provided to prevent a rust or other foreign bodies from falling from the gantry on to the plates.

The control system of the whole apparatus is automatically programmed to co-ordinate the operation of the pusher 33, the recirpocating suction cup 11, the two sets of air operated positioning pushers 22 and 22A, the retractable stop 19 and the lifting means. The working speeds of the pusher 33 and the suction cup 11 are such that as the plate is passed through the cleaning means via the oil opening 10 in the room from one conveying means to the other it is propelled in a smooth and continuous manner.

The arrangement is such that as the plate approaches the stop buffer 17 it operates a trip switch in the control circuit which operates distribution valves for the supply of compressed air and suction for the positioning pushers and suction cup respectively and stops the chain conveyor in its rest position: the automatic lifting means is automatically brought into operation after a suitable time lag by means of a pressure operated switch in the compressed air circuit. The plate is thereby lifted and poised ready to be automatically moved when required by the manual operation of a single switch to the laying-up table.

An example of the operation of the apparatus will now be described with particular reference to FIGURES 1 and 2. A new assembly (referred to as assembly A) is built up at the same time as a previously formed assembly (referred to as assembly B) is broken down into press plates and finished laminated boards. The immediate reuse of press plates obviates their being contaminated or damaged. A first group of operators dismantles completed panels interleaved with press plates which have been taken from the press by means of a trolley conveniently situated near the horizontal frame 13. A second group of operators enters room 12 and loads onto the table 24 a supply of impregnated sheets which have been arranged in the correct sequence. The opening 7 of the room 12 is closed, and the filtered pressurised air supply is started up.

The top caul plate first is removed from stack B and is passed into the room via the opening 10A. It is positioned manually on the laying-up table 23 as indicated by smybol 1 in FIGURE 2. As the caul plates are identical they may be used as either the top or the bottom of an assembly and thus the top caul plate of assembly B becomes the lower caul plate of assembly A. Pad sheets 6 are taken from the table 24 and placed on top of the caul plate. A single-sided polished plate is next removed from assembly B and provided it is not damaged in any way (this can readily be seen) it is inverted and placed on the bristle surface of the framework 13. A control switch is then closed with the result that the cleaning and extracting mechanism 15 is started up and the pusher 33 then engages the end of the plate and propels it partially through the cleaning apparatus 15. When the pusher 33 has almost reached the end of its stroke L–M, the vacuum is applied to the suction cup 11, which ascends, engages the underside of the plate and conveys it along the line H–K until it strikes the buffer member 17. Before it actually contacts the buffer the plate trips the limit switch of the control circuit and consequently vacuum is cut off from the suction cup to release the plate, after which it descends and travels from K to H to its initial rest position. The longitudinal limit stop 19 then rises to the operative position and compressed air is automatically delivered momentarily to the pushers 22 and 22A so that the plate is moved until it contacts the stop members 18 and 19. The plate is then accurately positioned and after the pushers have withdrawn the lifting means will lower the suction cups on to the plate, apply vacuum and lift the plate ready for the laying-up operators.

The plate remains poised in the above position until required, and on the operation of a switch conveniently situated near the laying up table is automatically traversed, lowered and released on top of the padding sheets 6 on the laying up table 23. The gantry then returns to its rest position above the plate positioning means ready to receive the following plate.

A pair of back-to-back laminates is removed from assembly B and a double-sided polished plate 4 is removed. After inspection the plate 4 is placed on the surface of the horizontal framework 13 and the sequence already described is repeated with the result that the plate is cleaned, conveyed and poised ready for the laying-up operators within the sealed room. Simultaneously with this operation the operators engaged in the laying-up add a set of sheets 3, a "glassine" sheet 5 and an identical but reversely assembled set of sheets 3 to the assembly A on the laying-up table. The double sided polished plate 4 is then added to the assembly in the manner described.

The operation is repeated in the above sequence until the desired number of sets of sheets and polished plates have been layed-up on assembly A, which is finally capped by a second single sided polished plate 2A (working face downwards), further padding sheets 6A and finally a second caul plate 1A that is manually passed through the opening 10A into the room. The aperture 7 of the room is then opened to permit the layin-up table 23 to be traversed along the guide rails 51 and into the press shop where its contents are deposited into one of the shelves of the press loader. The laying-up table is then returned to the sealed room and the process repeated.

Alternative methods of and means for carrying out and putting into effect the various parts of this invention will be readily apparent to those skilled in the art. For example the plate may be positioned on the framework 16 by methods which do away with the need for the retractable stop 19; in such a case the positioning can be achieved by providing the air-actuated pushers 22 and 22A with an appropriate from of pneumatic control system. The control system includes a limit switch which sets off a sequence of operations when it is contacted by the leading edge of a plate; operation of the limit switch causes the vacuum supplied to the vacuum cup 10 to be cut off, the conveyor to be arrested with the suction cup at lower most point of its travel remote from the cleaning device and compressed air to be momentarily admitted to the pushers 22 and 22A in a sequential manner. Air is first applied to the two transverse pushers 22A with the result that the plate is gripped in a yieldable manner against the fixed stops 18 and thus is accurately located in the transverse direction. Air is then admitted to the longitudinal pusher 22 which is provided with a fixed working stroke and is thus propelled towards the cleaning means through the distance which corresponds to the stroke of the piston 22 with the result that the plate is located accurately also in the longitudinal direction.

This invention is not limited to the manufacture of laminated plastic sheets and may be used equally in any manufacturing process which requires the cleaning and accurate positioning of sheets of any kind in conditions of substantial freedom from dust. In so far as the invention is particularly directed towards the manufacture of laminated plastic boards it is to be understood that laminates of any kind can be produced by the apparatus described no matter what resins, reinforcing material, sheet release system or arrangement of sheet assemblies is involved.

We claim:

1. A method of facilitating the preparation of a stack of metallic press plates together with interposed sheet materials for subsequent processing of the sheet materials between the said press plates comprising the steps of supporting the plates horizontally in such a manner that their surfaces are not marred or damaged, feeding the plates sequentially through a plate-cleaning and dust-removing unit and then through an adjacent slit-like opening to a first rest position within a stack-assembly chamber, sliding each plate to an exact second rest position, lifting each plate and then conveying it through a predetermined distance in its plane or in a plane parallel thereto to a position over a laying-up table adapted to receive both press plates and sheet materials for subsequent processing between the press plates and depositing the plate upon said table at a predetermined stage of the stack assembly process.

2. The method as claimed in claim 1 wherein pressurised clean air is supplied to the interior of the stack assembly chamber.

3. Apparatus for cleaning press plates and for conveying them to a laying-up table, such apparatus comprising a chamber, a laying-up table within the said chamber, a horizontal slit-like opening in one wall of the said chamber, a plate-cleaning and dust-removing unit arranged externally of and adjacent to the said slit-like opening, horizontal plate support means arranged both internally and externally of the said chamber and in alignment with the said slit-like opening and of such a nature that the plate surfaces in contact therewith are not marred or damaged, means for feeding press plates sequentially over the said plate-support means to a first rest position within the said chamber, pusher means adapted to slide each plate from the first rest position to an exact second rest position and conveyor means adapted to lift each plate from its second rest position and to move it through an exact predetermined distance in its plane or in a plane parallel thereto and to lower it on to the said laying-up table.

4. The apparatus as claimed in claim 3, including means for supplying clean air under pressure to the interior of the chamber and deformable sheet material positioned adjacent the slit-like opening so as to minimise air losses from the chamber.

5. Apparatus for cleaning press plates and for conveying them to a laying-up table, such apparatus comprising a chamber, a laying-up table within the said chamber, a horizontal slit-like opening in one wall of the said chamber, a plate-cleaning and dust removing unit externally of and adjacent to the slit-like opening, horizontal plate support means arranged both internally and externally of the chamber and in alignment with the slit-like opening and of such a nature that the plate surfaces in contact therewith are not marred or damaged, a first plate conveyor adapted to move a plate over the plate support means externally of the chamber and to propel the plate into the plate cleaning unit, a second plate conveyor adapted to remove the plate from the plate cleaning unit and to move it over the plate support means internally of the chamber to a first rest position, pusher means adapted to slide each plate from the first rest position to an exact second rest position and conveyor means adapted to lift each plate from its second rest position and to move it through an exact predetermined distance in its plane or in a plane parallel thereto and to lower it on to the laying-up table.

6. The apparatus as claimed in claim 5, wherein the plate support means comprises a plurality of upstanding bristles.

References Cited

UNITED STATES PATENTS

| | | | |
|---|---|---|---|
| 1,136,110 | 4/1915 | Eberhart | 134—9 X |
| 1,789,917 | 1/1931 | Tomlinson | 271—89 X |
| 2,036,501 | 4/1936 | Rhead et al. | 15—77 |
| 2,069,424 | 2/1937 | Seft | 271—89 X |
| 2,128,316 | 8/1938 | Paul | 271—89 |
| 2,790,536 | 4/1957 | Reed | 29—200 |

MORRIS O. WOLK, *Primary Examiner.*

D. G. CONLIN, *Assistant Examiner.*